Sept. 9, 1930.   F. J. SPANG   1,775,328
FISHING TOOL
Filed April 18, 1928
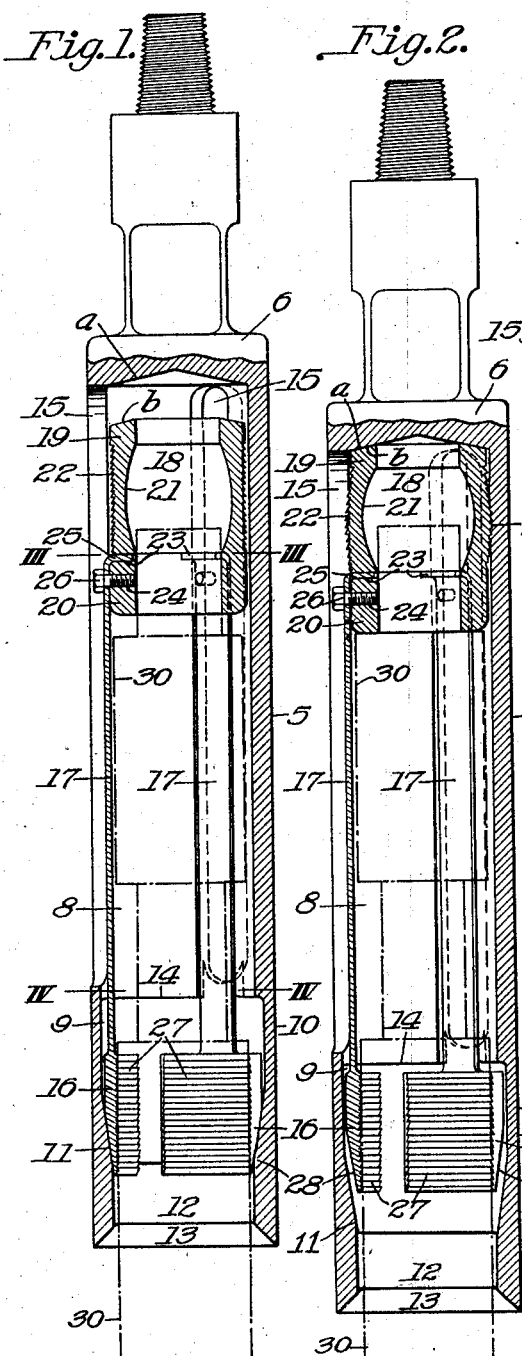
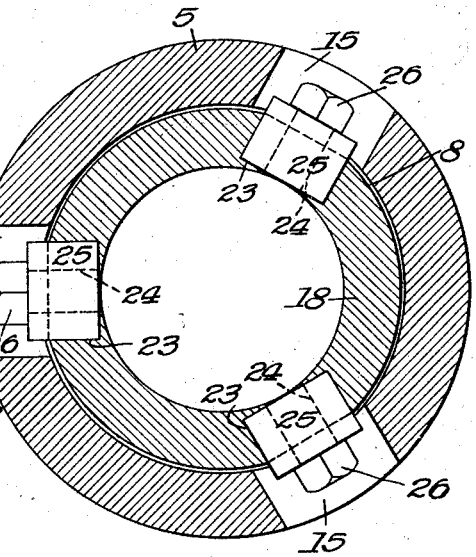
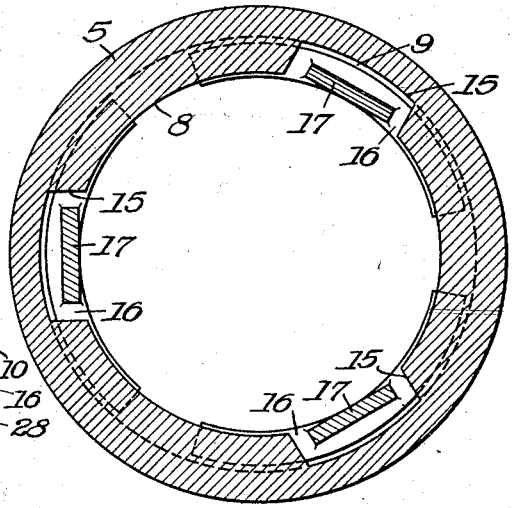
INVENTOR
F. J. Spang Patented Sept. 9, 1930

1,775,328

UNITED STATES PATENT OFFICE

FERDINAND J. SPANG, OF BUTLER, PENNSYLVANIA, ASSIGNOR TO SPANG AND COMPANY, OF BUTLER, PENNSYLVANIA, A CORPORATION OF PENNSYLVANIA

FISHING TOOL

Application filed April 18, 1928. Serial No. 270,949.

My invention relates to improvements in fishing tools employed in well drilling operations, and more particularly to a tool of the character stated of the slip socket type, designed for use in oil and gas wells.

The present invention is especially designed for fishing for rope sockets of the construction now so generally employed in the cable system of drilling, although it may be advantageously used for retrieving other lost tools and objects in a well.

I am aware that fishing tools of the character of the present invention have been provided with means for releasing the jaws of the fishing tool from the article gripped, but such prior art means have not worked out satisfactorily in practical use.

The prime object of the present invention is to provide a new and improved fishing tool of the type stated embodying simple and efficient means for enabling the tool to be released from the rope socket or other object in the event that it becomes impossible to raise the said rope socket, etc., in the usual fishing operation.

Other objects and advantages of the present invention will be pointed out in the following description, or will be apparent to those skilled in this art.

In the accompanying drawings, which illustrate an application of my invention:

Fig. 1 is a vertical sectional view of a fishing tool embodying my invention, showing the tool positioned over a lost rope socket;

Fig. 2, a view similar to Fig. 1, showing the parts of the tool in different positions and the gripping jaws released from the lost rope socket;

Fig. 3, an enlarged horizontal section taken on line III—III of Fig. 1; and

Fig. 4, an enlarged horizontal sectional view, the section being taken on line IV—IV of Fig. 1.

Referring to the drawings, and as preferred, the fishing tool embodying my invention includes a body designated generally by the numeral 5, preferably made from nickel or other high grade steel, and heat treated. The body has integral therewith a solid head portion 6 provided with the usual wrench portions and threaded extension, and is formed with a central bore 8 extending downwardly from the head throughout the length of the body. The bore 8 is enlarged towards its lower end, as indicated at 9, by thinning for a portion of its length the solid wall of a slip socket portion 10 positioned at the lower part of the body. Below the enlargement 9, the bore is gradually tapered to provide an annular tapering slip seat 11 or a tapering socket portion designed to receive and cooperate with slips, hereinafter described. 12 designates a non-tapering portion of the bore within the socket portion 10, and at 13 the bore is again tapered. The enlargement of the bore at 9 produces a shoulder 14 at the upper end of the socket wall portion 10.

Extending downwardly from the head 6 to the upper end of wall portion 10, the body is formed with a number of longitudinally extending slots 15, three slots 15 being shown by the drawings.

Located within the hollow body or the bore 8 thereof, and designed to cooperate with the lower portion 10 of the body, I provide gripping means including, as shown, a plurality of slips 16 having the reins 17 thereof positioned in the vertically extending slots 15 of the body. The slip reins are each designed to be suspended from a metallic expansible reciprocal collar or ring member 18.

This member 18 forms an important and characteristic feature of the present invention. As shown, member 18 comprises an elongated cylindrical hollow member having its wall thickened at its respective upper and lower ends, as shown at 19 and 20, and is formed with an intermediate weakened or thinner portion having an interior annular bowed surface 21 and an outer serrated surface 22, the latter being designed to grip or bite the body of the tool when the member is expanded. Member 18, in addition to the parts mentioned, is provided with slots 23 and rivet or bolt holes 24.

The slots and holes just described are designed to cooperate with means on the upper ends of the reins of the slips for securing the latter to member 18. It will be noted that each rein is flanged at its upper end, as shown by the numeral 25, and that each rein is formed with a hole designed to register with a hole 24 of member 18 when the parts are assembled. The flanges 25 are adapted to be entered in the slots 23, and the reins are securely attached to member 18 by means of rivets or bolts 26.

Reverting to the slips 16, it will be seen that each slip includes an inner curved toothed or serrated gripping surface 27 designed to grip the rope socket or object sought to be raised from the well, and has an outer tapered contacting surface 28 designed to be positioned on the tapered seat or the portion of the bore 11 and to cooperate therewith in producing gripping engagement with the objects.

In the drawings, I have shown in outline a rope socket indicated by 30, and as my invention is particularly adapted for attachment to and for raising a tool of this character from a well, the operation of my invention will be described in connection with this tool 30.

It will be understood that the weight of the tool gripping means, including the slips, reins and the collar 18, is sufficient to maintain the relative position of the body and the said gripping means, as shown by Fig. 1, during the act of lowering the tool down a well. At this time, the tapered contact faces of the slips are seated upon the tapered annular seat of the portion 10 of the body, and will remain thus positioned until the fished for object is encountered. Upon striking the lost article, the contracted slips will be forced upwardly somewhat and a continued downward movement of the fishing tool will lower it over or around the rope socket. As the slips move, they are expanded in the portion 10 of the body sufficiently to permit the socket to pass between them, thus bringing the rope socket into contact with the collar 18, whereupon, by raising the body, the slips or gripping jaws will be contracted and forced into binding engagement with the rope socket, thus setting the parts for withdrawal of the said rope socket by raising the fishing tool.

In some cases, however, it is impossible to raise the rope socket by means of the fishing tool, and when this is found to be the case, it is necessary, in order to withdraw the fishing tool, to disengage or release it from the article sought to be raised. With my invention, this disengagement may be readily accomplished by jarring. In the jarring operation, it will be understood that the head of the body is dropped with considerable force against the upper edge of the collar 18, so that the inclined surface a of the striking head 6 and the correspondingly bevelled contact surface b of the member 18 meet to expand said collar into tight engagement with the body, as particularly shown by Fig. 2, and to move the body downwardly relatively to the gripping jaws or slips, so that the said slips will be in the position shown by Fig. 2. When this is accomplished, the fishing tool may be drawn away from the lost rope socket and raised to the surface of the ground in the usual and well known manner.

I claim:

1. In a fishing tool, the combination with a hollow body member, of means provided with gripping jaws disposed and movable within the body, said means including an expansible member having a serrated exterior portion operable to effect a binding engagement with the body of a jarring operation, said means being freely movable within the body prior to the jarring operation.

2. In a fishing tool, the combination with a hollow body member, of an expansible member provided with gripping jaws disposed and freely movable within the body, means on said body for contracting said jaws upon relative movement of the body and jaws, said expansible member operable to effect a binding engagement with the body by a jarring operation so as to prevent the operation of the gripping jaws.

3. In a fishing tool, the combination with a hollow body member, of an elongated expansible hollow cylindrical member having gripping jaws attached thereto disposed and movable within the body, said expansible member having a serrated body contacting portion and operable to effect a binding engagement with the body by a jarring operation so as to prevent the operation of the gripping jaws.

4. In a fishing tool, the combination with a hollow body member, of an elongated expansible hollow cylindrical member having gripping jaws attached thereto disposed and movable within the body, said expansible member having the wall thereof thickened at its ends and formed with an intermediate weakened portion and having its exterior serrated and operable to effect a binding engagement with the body by a jarring operation so as to prevent the operation of the gripping jaws.

5. In a fishing tool, the combination with a hollow body member having a conical bore at its lower end, of an expansible hollow cylindrical member, a series of slips having reins extending longitudinally of the body and secured to the expansible member, said expansible member and slips disposed and movable within the body and having the slips arranged for cooperation with the conical bore for contracting the slips, said expansible member having its exterior serrated and operable to effect a binding engagement with the body by a jarring operation.

In testimony whereof I affix my signature.

FERDINAND J. SPANG.